(12) United States Patent
Freed

(10) Patent No.: US 6,603,869 B1
(45) Date of Patent: Aug. 5, 2003

(54) METHOD OF USING PERIMETER MEASUREMENTS TO IMPROVE PLOIDY ANALYSIS IN A TISSUE SECTION

(76) Inventor: Jeffrey A. Freed, 407 Valley Ave., NE., Apt. S-307, Puyallup, WA (US) 98372

( * ) Notice: Subject to any disclaimer, the term of this patent is extended or adjusted under 35 U.S.C. 154(b) by 0 days.

(21) Appl. No.: 09/518,210

(22) Filed: Mar. 3, 2000

(51) Int. Cl.$^7$ .................................................. G06K 9/00
(52) U.S. Cl. ................................... 382/129; 424/132.1
(58) Field of Search ............................ 382/129, 133, 382/100, 128, 156, 190, 159; 435/6, 455, 7.23, 7.21, 183, 320.1; 356/318, 320, 39; 424/133.1, 132.1, 135.1; 514/44; 536/23.1; 436/63; 703/11

(56) References Cited

U.S. PATENT DOCUMENTS

| | | | | |
|---|---|---|---|---|
| 4,956,725 A | * | 9/1990 | Kozuki et al. .................. | 386/57 |
| 5,016,283 A | * | 5/1991 | Bacus et al. .................. | 382/129 |
| 5,235,522 A | * | 8/1993 | Bacus .......................... | 702/19 |
| 5,548,661 A | * | 8/1996 | Price et al. .................. | 382/133 |
| 5,733,721 A | * | 3/1998 | Hemstreet et al. ............. | 435/6 |
| 5,878,746 A | * | 3/1999 | Lemelson et al. ........... | 600/407 |
| 5,918,038 A | * | 6/1999 | Freed .......................... | 703/11 |
| 5,925,519 A | * | 7/1999 | Jensen et al. .................. | 435/6 |
| 5,994,071 A | * | 11/1999 | Ross et al. ...................... | 435/6 |
| 6,035,258 A | * | 3/2000 | Freed .......................... | 702/20 |
| 6,239,327 B1 | * | 5/2001 | Grossniklaus et al. ...... | 800/278 |
| 6,316,234 B1 | * | 11/2001 | Bova et al. .............. | 435/173.7 |

OTHER PUBLICATIONS

U.S. patent application Ser. No. 08/929,273, freed, filed 1997.

Freed JA. Possibility of Correcting Image Cytometric Nuclear DNA (Ploidy) Measurements in Tissue Sections. Insights From Computed Corpuscle Sectioning and the Reference Curve Method. Anal Quant Cytol Histo 19:376–386, 1997.

Freed JA, Improved Correction of Quantitative Nuclear DNA (Ploidy) Measurements in Tissue Sections. Anal Quant Cytol Histol 21:103–112, 1999.

Freed JA. Conceptual Comparison of Two Computer Models of Corpuscle Sectioning and of Two Algorithms for Correction of Ploidy Measurements in Tissue Sections. Anal Quant Cytol Histol 22:17–25, 2000.

Bins M and Takens F. A Method to Estimate the DNA Content of Whole Nuclei From Measurements Made on Thin Tissue Sections. Cytometry 6:234–237, 1985.

Haroske G et al. Feasibility and Limitations of a Cytometric DNA Ploidy Analysis Procedure in Tissue Sections. Zentralbl Pathol 139:407–417, 1993.

McCready RW and Papadimitriou JM. An Analysis of DNA Cytophotometry on Tissue Sections in a Rat Liver Model. Anal Quant Cytol 5: 117–123, 1983.

Bacus JW and Bacus JV. A Method of Correcting DNA Ploidy Measurements in Tissue Sections. Modern Pathol 7: 652–664, 1994.

\* cited by examiner

*Primary Examiner*—Jayanti K. Patel
*Assistant Examiner*—Seyed Azarian

(57) ABSTRACT

A method for correcting quantitative DNA measurements in a tissue section in which an operator measures, using an image analysis apparatus, the DNA content, profile area, and profile perimeter data for a plurality of nuclei and truncated nuclei in a Feulgen-stained histologic tissue section. The operator then operates a computer program embodying a method of analyzing ploidy measurements in a tissue section. The program includes a routine for obtaining an eccentricity index, which reflects the shape of each of the profiles of the nuclei and truncated nuclei in the tissue section. The program uses the eccentricity index of each nucleus and truncated nucleus to improve the accuracy of the calculation of the DNA content of the whole nuclei that existed in the tissue prior to making the tissue section, and to improve the discrimination of subpopulations of nuclei of different DNA content.

14 Claims, 6 Drawing Sheets

METHOD OF USING PERIMETER MEASUREMENTS TO IMPROVE PLOIDY ANALYSIS IN A TISSUE SECTION

CROSS-REFERENCES TO RELATED APPLICATIONS

This invention, in some of its embodiments, uses the transmission of patent application Ser. No. 08/929,273 to Freed (allowed) for Method for Correction of Quantitative DNA Measurements in a Tissue Section and U.S. Pat. No. 5,918,038 to Freed for General Method for Determining the Volume and Profile Area of a Sectioned Corpuscle.

BACKGROUND—FIELD OF INVENTION

This invention relates to the interpretation of data from an assay of a biological cell sample, and more particularly, to quantitative DNA measurements in a tissue section.

BACKGROUND—DESCRIPTION OF PRIOR ART

Cancer diagnosis and prognosis is largely dependent on the pathologic examination of tissue surgically removed from a patient. The specific diagnosis is made by a pathologist, who classifies the tumor by site and by cell of origin after examining stained histologic sections of the fixed, paraffin-embedded cancer tissue. The prognosis depends on many factors, including the specific diagnosis, the presence and pattern of tumor metastasis, the extent of tumor at its site of origin and its proximity to vital structures, and the tumor grade as assessed by a pathologist. In some organs, such as the prostate, the usual determinants of prognosis are inadequate to provide a patient-specific prognosis, especially when such is desired prior to definitive therapy. Consequently, other prognostic indicators have been sought.

One prognostic indicator which has been valuable in the cancers of certain organs is DNA ploidy, which is the ratio of the quantity of DNA in a cancer cell to that in a normal cell in the resting phase of its growth cycle. In general, tumors with normal resting-phase cellular DNA content (diploid) have a better prognosis than those with twice that amount (tetraploid), and these in turn have a better prognosis than those with abnormal DNA content which is not tetraploid (non-tetraploid aneuploid).

The cellular DNA is located in the nucleus. Various methods have been developed for measuring the DNA content of whole nuclei. These methods do not make it possible for the measured cells to be correlated with their position or appearance in a standard histologic section. Thus, it is likely that normal cells will be measured together with tumor cells. Also, distinct areas of tumor cannot be measured separately. An even more important consideration is that very small samples, such as prostate thin core biopsies, are unsuitable.

All of these limitations have been overcome by measuring the DNA content of nuclei and partial nuclei in Feulgen-stained standard histologic sections. A new problem is created, however, by the inevitable inclusion of partial nuclei among the analyzed nuclei. In many sections, because the nuclear diameter exceeds the section thickness, all of the nuclei in the section will be truncated, resulting in a measured DNA content which is less than that of the whole nuclei which existed prior to sectioning the tissue. One consequence is that some nuclei which should be considered tetraploid are assigned a DNA content corresponding to aneuploid or S-phase nuclei, making the prognosis seem worse than it is. Another consequence is a marked inability to discriminate subpopulations of different ploidy in a mixed sample, making such a case uninterpretable.

Several algorithms to correct for the effect of truncated nuclei in a tissue section have been proposed, all based on spherical model nuclei, and described in various articles in the scientific literature (A Method to Estimate the DNA Content of Whole Nuclei from Measurements Made on Thin Tissue Sections, published in Cytometry, Volume 6, pp. 234–237, in 1985 by M. Bins and F. Takens; Feasibility and Limitations of a Cytometric DNA Ploidy Analysis Procedure in Tissue Sections, published in Zentralblatt Pathologie, Volume 139, pp. 407–417, in 1993 by G. Haroske, et. al.; An Analysis of DNA Cytomicrophotometry on Tissue Sections in a Rat Liver Model, published in Analytic and Quantitative Cytology, Volume 5, pp. 117–123, in 1983 by R. W. McCready and J. M. Papadimitriou). These algorithms have been studied using data from a computer model of tissue sectioning (Possibility of Correcting Image Cytometric Nuclear DNA (Ploidy) Measurements in Tissue Sections: Insights from Computed Corpuscle Sectioning and the Reference Curve Method, published in Analytical and Quantitative Cytology and Histology, Volume 19, pp. 376–386, in 1997 by J. A. Freed; U.S. Pat. No. 5,918,038 to Freed for General Method for Determining the Volume and Profile Area of a Sectioned Corpuscle). All methods perform poorly when the nuclei are non-spherical, except when extraordinary care is taken regarding selection of section thickness and of nuclear profiles for analysis. Also, when the non-spherical nuclei have inhomogeneous intranuclear DNA distribution or when the tissue sections are wavy, the performance of these algorithms is markedly degraded, particularly when the DNA concentration varies from one nucleus to another; generally, such cases are uninterpretable. The reference curve method (RCM), described in Possibility of Correcting Image Cytometric Nuclear DNA (Ploidy) Measurements in Tissue Sections: Insights from Computed Corpuscle Sectioning and the Reference Curve Method, published in Analytical and Quantitative Cytology and Histology, Volume 19, pp. 376–386, in 1997 by J. A. Freed; and in patent application Ser. No. 08/929,273 (allowed) to Freed for Method for Correction of Quantitative DNA Measurements in a Tissue Section, has theoretical and practical advantages over the algorithm of McCready and Papadimitriou (as shown in Conceptual Comparison of Two Computer Models of Corpuscle Sectioning and of Two Algorithms for Correction of Ploidy Measurements in Tissue Sections, published in Analytical and Quantitative Cytology and Histology, Volume 22, pp. 17–25, in 2000 by J. A. Freed). However, the problem of distinguishing subpopulations of different ploidy in a tissue section, which is a precondition for successful analysis, has not been solved in many cases.

In U.S. Pat. No. 5,235,522 to Bacus for Method and Apparatus for Automated Analysis of Biological Specimens and in A Method of Correcting DNA Ploidy Measurements in Tissue Sections, published in Modern Pathology, Vol. 7, pp. 652–664, 1994, an apparatus and method for measuring the DNA content of nuclei in tissue sections is described, as well as a method for correction of DNA measurements necessitated by nuclear truncation. The limitations of this method have been discussed in detail in patent application Ser. Pat. 08/929,073 (allowed) to Freed for Method for Correction of Quantitative DNA Measurements in a Tissue Section. Based as it is on the algorithm of McCready and Papadimitriou, the Bacus method shares the weaknesses of that algorithm. The novel feature is that the Bacus method allows the operator to define classes of attributes, thereby excluding many unwanted truncated nuclei from analysis; such an approach (which they call morphometric filtering) is helpful but may be of limited value because the a priori classes may not accord with the natural classes in the specimen being analyzed. Nuclear profile shape is one of the morphometric filters mentioned in passing in A Method of Correcting DNA Ploidy Measurements in Tissue Sections, published in Modern Pathology, Vol. 7, pp. 652–664, 1994, but how it is obtained and its specific use are not described at all. In U.S. Pat. No. 5,235,522 to Bacus for Method and Apparatus for Automated Analysis of Biological Specimens, perimeter is used to determine a 'shape factor' as one parameter used to define the classes to which a cell object can be assigned, but the specific use of this shape factor is not elucidated. Excepting Conceptual Comparison of Two Computer Models of Corpuscle Sectioning and of Two Algorithms for Correction of Ploidy Measurements in Tissue Sections, published in Analytical and Quantitative Cytology and Histology, Volume 22, pp. 17–25, in 2000 by J. A. Freed, and Improved Correction of Quantitative Nuclear DNA (Ploidy) Measurements in Tissue Sections, published in Analytical and Quantitative Cytology and Histology, Volume 21, pp. 103–112, in 1999 by J. A. Freed, there is no mention at all in any prior art of the specific importance and use of perimeter data, that it can improve the accuracy of ploidy analysis, or that it can improve discrimination of ploidy subpopulations in a mixed population.

OBJECTS AND ADVANTAGES

Several objects and advantages of the present invention are:

(a) to improve, in a tissue section, discrimination of different ploidy subpopulations in a mixed population;

(b) to increase the proportion of tissue sections in which ploidy analysis can be interpreted correctly or interpreted at all;

(c) to improve, in a tissue section, the accuracy of the determination of quantitative nuclear DNA content of each ploidy subpopulation;

(d) to provide a clear indication of nuclear shape;

(e) to provide a method to more accurately classify tumors into the correct prognostic categories;

(f) to provide a method in which non-spherical nuclei can be more readily analyzed;

(g) to provide a method which exceeds the performance of existing methods; and (h) to overcome problems created when the internal diploid control nuclei have different characteristics than the nuclei being analyzed.

DRAWING FIGURES

Figure 1:
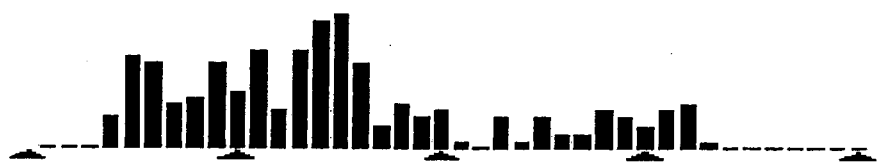
FIG. 1 shows the MMP without the present invention.

REFERENCE NUMERALS IN DRAWINGS 1 the modal bar aligns with the pyramid marking DI=1
2 the bar of highest ploidy nearly aligns with the pyramid marking DI=2
3 lower reference curve corresponding to DI=1
4 upper reference curve corresponding to DI=2
5 diploid data curve
6 tetraploid data curve

SUMMARY

In accordance with the present invention, a method for correcting quantitative nuclear DNA measurements by an image analysis apparatus in tissues sections comprises a computer program in which the measured nuclear image data, including perimeter, are used to calculate an eccentricity index for each nucleus and truncated nucleus. These eccentricity indicies then are used to improve the accuracy of the calculated DNA index of each ploidy subpopulation, and also to improve discrimination of ploidy subpopulations in a mixed sample.

DESCRIPTION AND OPERATION— PREFERRED EMBODIMENT

In the preferred embodiment, a computer program written in TurboPascal v. 7.0 (Borland International, Inc., Scotts Valley, Calif.) runs on an IBM-compatible personal computer equipped with central processing unit, random access memory, a floppy disk drive, a hard drive, a standard keyboard, a printer, and a video monitor. An operator downloads data (including quantitative nuclear DNA content, profile area, and profile perimeter for each of a plurality of cell nuclei and cell nuclei in a tissue section) obtained by image analysis of a tissue section, and then can employ both the MMP and the RCM in each of the below Modes of operation, switching from one mode to another at will. This gives many different perspectives on the interpretation of the data.

The present invention calculates an eccentricity index for each nucleus and truncated nucleus, and uses it to improve the accuracy of the calculated ploidy and to improve discrimination of the different ploidy subpopulations. The eccentricity index ($\epsilon$) is calculated as the ratio, raised to a power (x), of the perimeter of a nuclear or truncated nuclear profile (Ps) to that of a circle (Pc) whose area equals the area of the nuclear or truncated nuclear profile (As). Thus $\epsilon=(Ps/Pc)^x$ where $Pc=2(\pi As)^{1/2}$. In the preferred embodiment, x=2.

There are several ways (modes) in which the eccentricity index can be used to improve either the accuracy of the ploidy analysis program, or the ability of the ploidy analysis program to distinguish subpopulations of different ploidy. The formulae were found empirically and were selected to work over a broad range of nuclear shapes.

Figure 2:
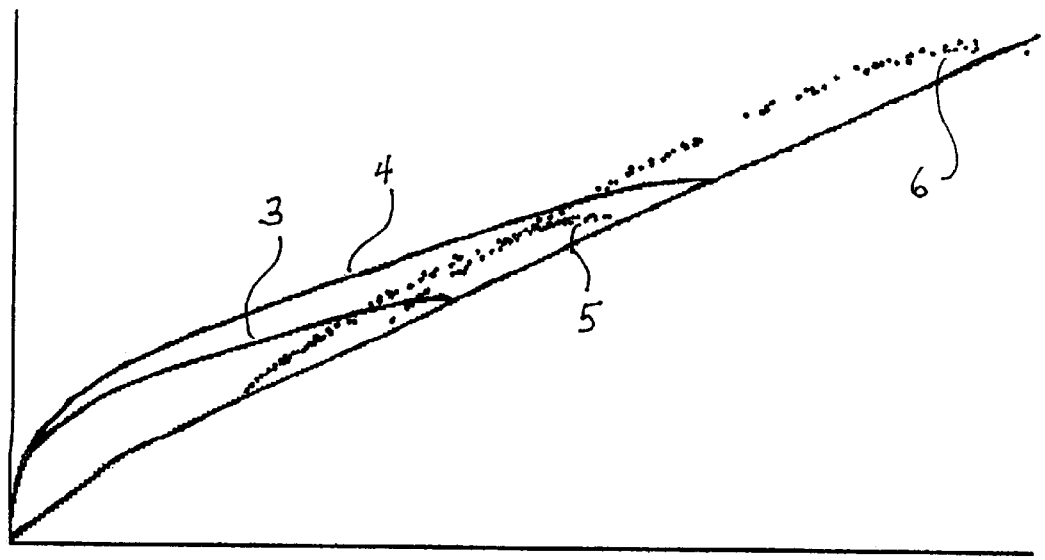
FIG. 2 shows the RCM without the present invention.
Figure 3:
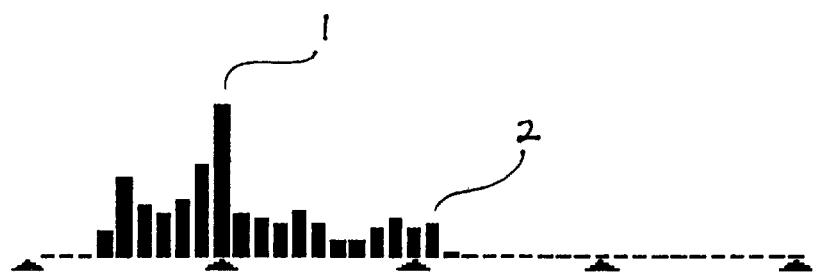
FIG. 3 shows the MMP in the First Mode of the present invention.
Figure 4:
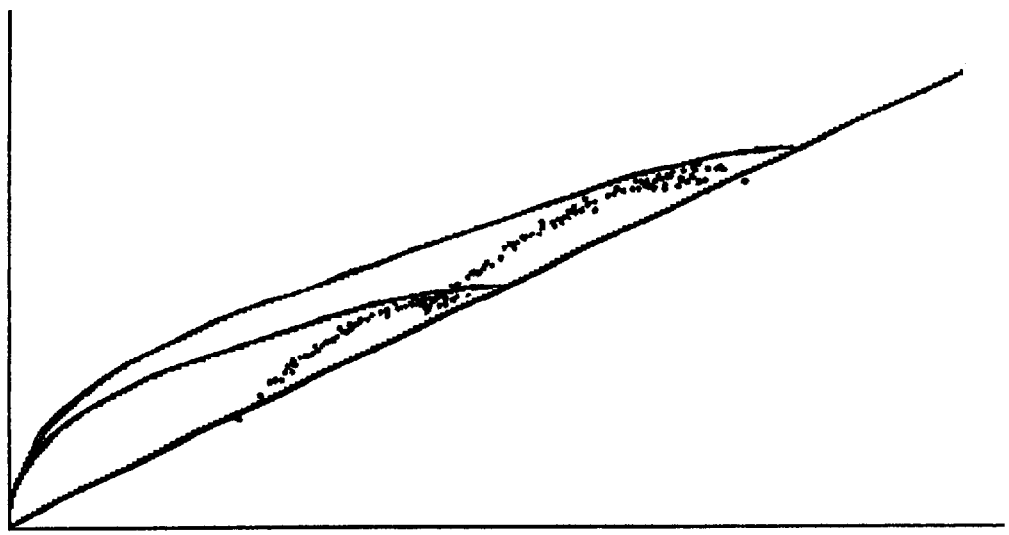
FIG. 4 shows the RCM in the First Mode of the present invention.

In First Mode, the measured DNA content (Ds) and profile area (As) of each nucleus or truncated nucleus are treated as the ploidy analysis program usually treats these data, but if $\epsilon$ is greater than unity, an additional subsequent calculation is performed before the data are displayed, in which each value of Ds (and As, if the ploidy analysis program is the RCM) is divided by $(1+f(\epsilon-1))^y$ (where y=0.6 and f=3 in the preferred embodiment) if the nuclei are prolate ellipsoids, or multiplied by the same quantity if the nuclei are oblate ellipsoids. (The RCM in this mode and in each of the modes discussed below discriminates oblate from prolate nuclei. In this mode, use of the appropriate operation (division or multiplication) causes the data points of each population to cluster more tightly, whereas they disperse if the inappropriate operation is employed.) FIG. 1 shows the MMP without the present invention applied to a computer-generated data set consisting of 100 diploid and 100 tetraploid nuclei, all markedly prolate ellipsoids (E=1.9) in an ultrathin non-wavy tissue section (Vi/Vt=100), with constant internuclear DNA concentration and homogeneous intranuclear DNA distribution. There is a nuclear profile selection bias in favor of eccentric nuclear profiles, and only center-containing sections of nuclei are included, in accord with recommendations for obtaining optimal results (see Improved Correction of Quantitative Nuclear DNA (Ploidy) Measurements in Tissue Sections, published in Analytical and Quantitative Cytology and Histology, Volume 21, pp. 103–112, in 1999 by J. A. Freed). (The same data set will be used for all of the examples to follow.) FIG. 3 shows the MMP in the First Mode. The tiny pyramids mark consecutive integer values, starting on the left-hand side with zero, of the corrected DNA index (DI), which is the ratio of the corrected DNA content of the nuclei being analyzed to that of a diploid nucleus in the resting phase of the growth cycle. The height of the histogram bars is proportional to the number of corrected data points in each bar. If correction were perfect, there would be one bar at DI=1 (second pyramid from the left), and a second bar of equal height at DI=2 (third pyramid from the left), only. Without the present invention, the MMP gives a falsely increased ploidy (the modal (diploid) bar and the bar of highest ploidy (tetraploid) are shifted to the right), there are many shorter histogram bars which reflect nuclear truncation and which blur the distinction between the two subpopulations, and the height of the bar of highest ploidy is diminished. In contrast, the MMP in First Mode of the present invention gives the approximately correct ploidy for both subpopulations (the modal bar 1 and the bar of highest ploidy 2 align or nearly align with the pyramids marking DI=1 and DI=2). FIG. 2 shows the RCM without the present invention, and FIG. 4 shows the RCM in the First Mode. The lower reference curve 3 represents a DI of 1; and the upper 4, a DI of 2. There are two arcs of data points (data curves) corresponding to the diploid (lower) 5 and tetraploid (higher) 6 subpopulations, respectively. The 'tail' of the tetraploid arc intersects and overlaps with the 'head' of the diploid arc when the present invention is not used, but the overlap is decreased when First Mode of the present invention is used. Also, when the present invention is not used, the DI of both the diploid and tetraploid subpopulations is falsely elevated (the reference curves fall short of the heads of the data curves), but with the present invention in First Mode, nearly correct DNA Indicies are obtained (the reference curves nearly coincide with the heads of the data curves).

Figure 5:
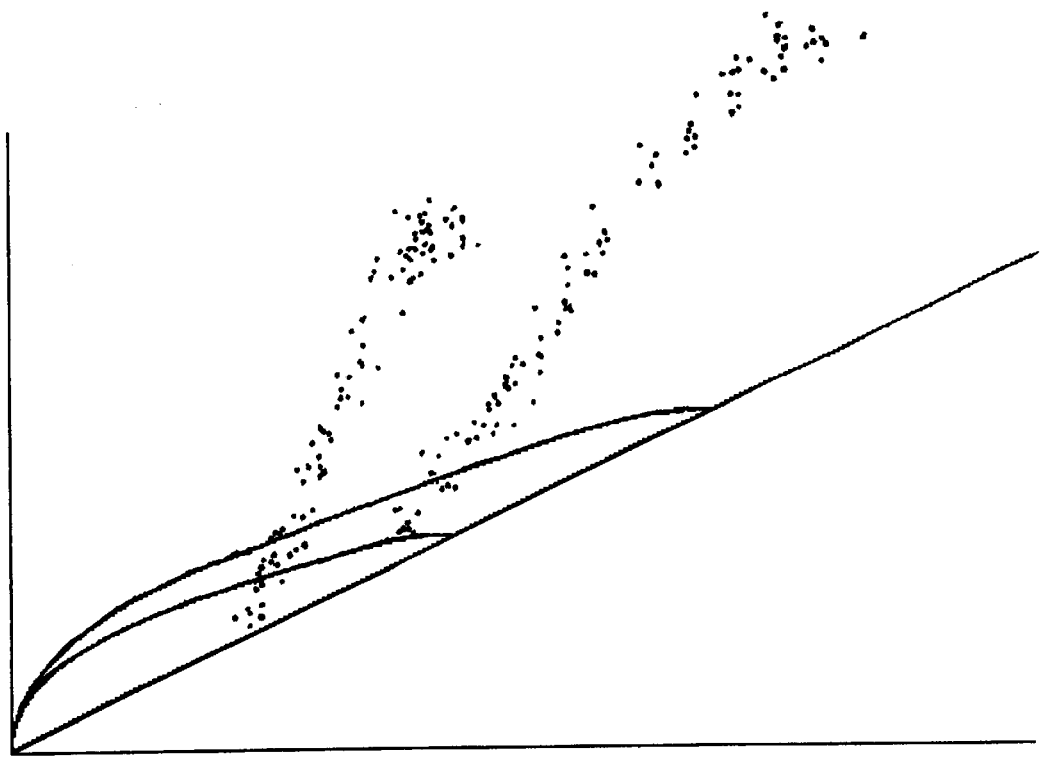
FIG. 5 shows the RCM in the Second Mode of the present invention.

In Second Mode, the data curves of the RCM are deflected perpendicular to the reference line by subtracting $30(2\epsilon/3-2/3)(Vi/Vt)/64$ from Ds and by adding $30(3\epsilon/2-3/2)(Vi/Vt)/64$ to As. The result is displacement of the data points perpendicular to the reference line in proportion to $\epsilon$, resulting in improved discrimination of the diploid subpopulation from the tetraploid subpopulation, as shown in FIG. 5. Vi/Vt is calculated by the RCM and is used to appropriately adjust the amount of the displacement with respect to the relationship between nuclear size and section thickness. The direction of the displacement indicates whether the nuclei are prolate (head displaced more than tail) or oblate (tail displaced more than head).

Figure 6:
FIG. 6 shows the MMP in the Third Mode of the present invention.
Figure 7:
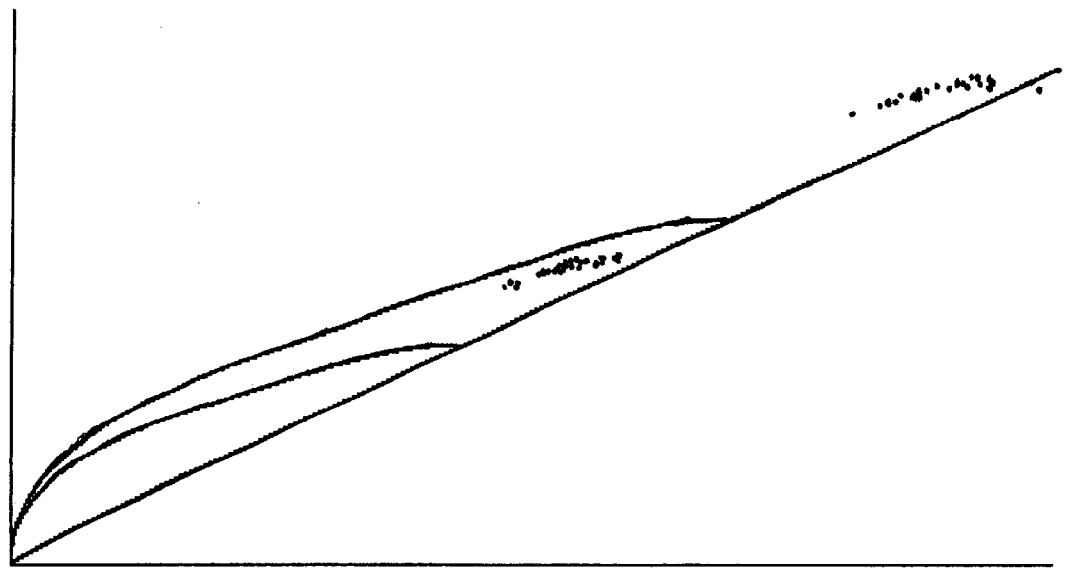
FIG. 7 shows the RCM in the Third Mode of the present invention.

In Third Mode, the data set is ranked by $\epsilon$; the most eccentric 30% of data points are selected (the remainder are ignored) and the MMP (FIG. 6) and the RCM (FIG. 7) are applied to the selected data points. In each case, the diploid and tetraploid subpopulations can be distinguished extraordinarily well. Variations on Third Mode include selecting only the least eccentric data points, or only those of average eccentricity. These variations typically are not as effective as selecting the most eccentric data points. If the nuclei are oblate, the nuclear profiles and truncated nuclear profiles with the highest DNA content are also the most eccentric, whereas the reverse is true if the nuclei are oblate.

Figure 8:
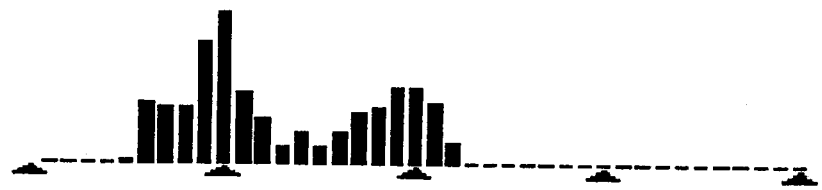
FIG. 8 shows the MMP in the Fourth Mode of the present invention.
Figure 9:
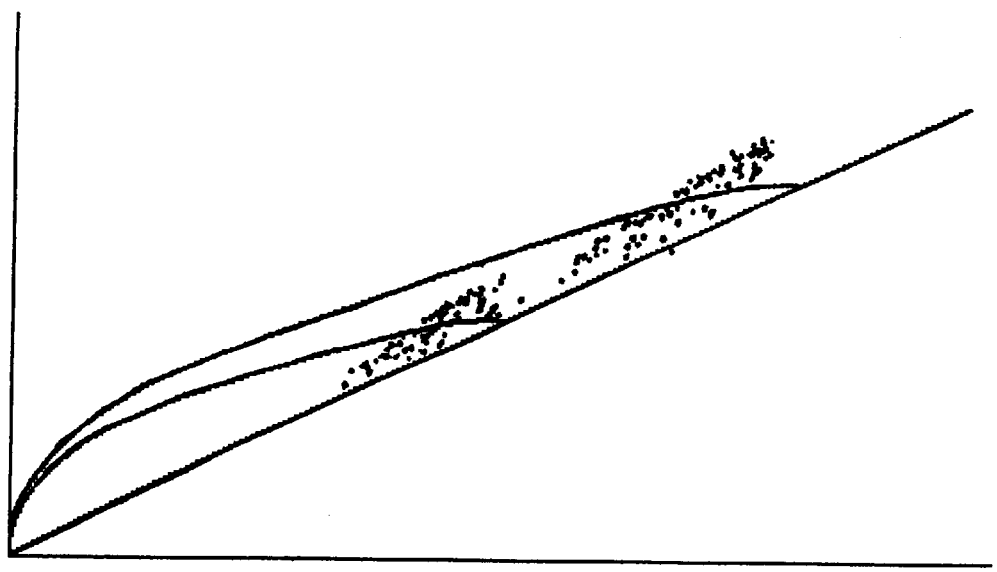
FIG. 9 shows the RCM in the Fourth Mode of the present invention.

In Fourth Mode, the mean value of $\epsilon$ ($\epsilon$m) for the entire data set is calculated, then (after the usual calculations of the ploidy analysis method have been performed) Ds and As are each multiplied by $(1+f((\epsilon m-\epsilon)/\epsilon m))^z$. (In the preferred embodiment, z=0.6 and f=4.) In Fourth Mode, both the MMP (FIG. 8) and the RCM (FIG. 9) produce better clustering of the diploid and tetraploid data points about their respective centers. This produces better discrimination of diploid and tetraploid subpopulations as well as more accurate ploidy values. Fourth Mode is modified for oblate nuclei by multiplying by $(1-f((\epsilon m-\epsilon)\epsilon m))^z$. As in First Mode, use of the appropriate procedure causes the data points to cluster more tightly, whereas use of the inappropriate procedure causes the data points to disperse.

Figure 10:
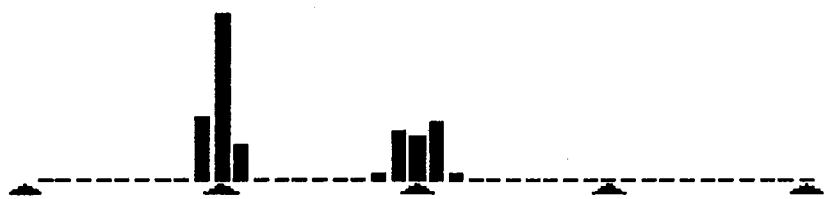
FIG. 10 shows the MMP in the Fifth Mode of the present invention.
Figure 11:
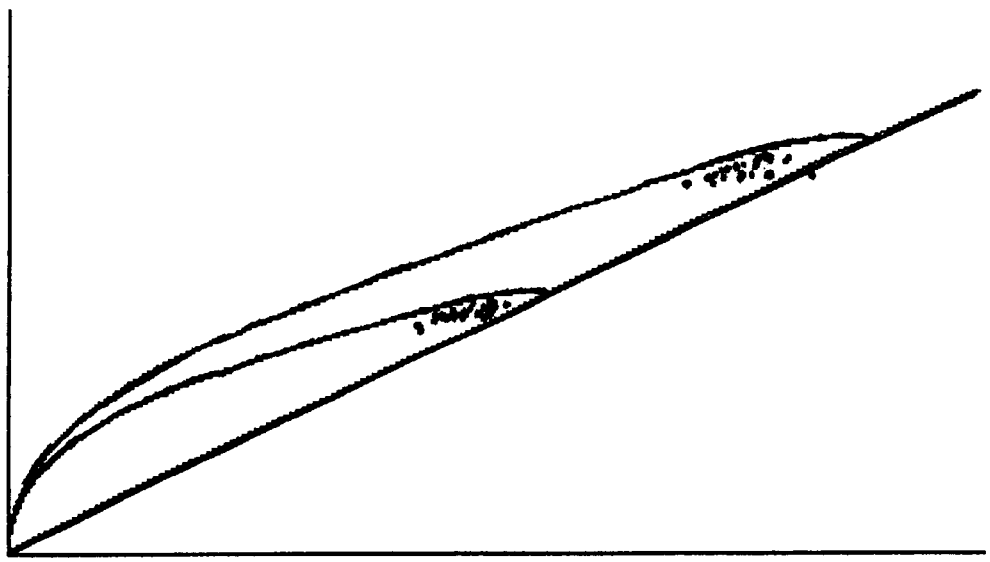
FIG. 11 shows the RCM in the Fifth Mode of the present invention.

Fifth Mode consists of a combination of Third Mode (selecting only the most eccentric nuclear profiles to improve discrimination of different ploidy subpopulations) and First Mode (to improve the accuracy of the calculated ploidy). The result is remarkable with either the MMP (FIG. 10) or the RCM (FIG. 11).

Sixth Mode consists of simply coloring each data point according to $\epsilon$. For example, if $\epsilon$ is less than 1, color red; if $1<\epsilon<1.03$, color yellow; if $1.03<\epsilon<1.06$, color green; if $1.06<\epsilon<1.09$, color pale blue; if $1.09<\epsilon<1.12$, color white; if $1.12<\epsilon<1.15$, color dark blue; if $,\epsilon>1.15$, color violet. It works with both the MMP and with the RCM, and improves discrimination of subpopulations of different ploidy. When other modes are combined with the Sixth Mode, the results can be even better than with either mode alone. In Sixth Mode, oblate and prolate nuclei can be distinguished at a glance: If prolate, the nuclear and truncated nuclear profiles of highest DNA content are also the most eccentric, whereas the reverse is true if the nuclei are oblate.

SUMMARY, RAMIFICATIONS, AND SCOPE

Accordingly, the reader will see that the method of this invention can augment existing methods for analyzing ploidy in a tissue section, with the result of improving discrimination of subpopulations of different ploidy in a mixed sample while also improving the accuracy of the ploidy measurements. In some modes, the MMP is improved because the height of the bar of greatest ploidy is not falsely shortened to the same extent with the present invention as it is without the present invention. The efficacy of the present invention is so great that some feats formerly thought to be impossible can now be done with relative ease. For example, sections of intermediate thickness (such as Vi/Vt=10) can be analyzed almost as successfully and easily as ultrathin sections (such as Vi/Vt=100). Also, such complicating factors as inhomogeneous intranuclear DNA distribution, wavy sections, and variable internuclear DNA concentration, which formerly made ellipsoidal nuclei impossible to analyze, now can be overcome in at least some cases. All of the modes of operation allow the operator to determine the nuclear shape (whether prolate or oblate), which is useful in identifying and compensating for situations in which the diploid internal control nuclei differ in shape from the population being analyzed, thus avoid overestimating or underestimating ploidy.

Although the description above contains many specificities, these should not be construed as limiting the scope of the invention but as merely providing an illustration of the presently preferred embodiment of this invention. Thus, the above-described different Modes of operation do not exhaust the possible modes or combinations thereof.

Application of the present invention to methods of ploidy analysis other than the MMP and the RCM also is possible. The computer program which incorporates the preferred embodiment of the present invention could be written in another language, or configured differently.

Thus the scope of the invention should be determined by the appended claims and their legal equivalents, rather than by the example given.

I claim:

1. In an image analysis apparatus, a method of analyzing a plurality of cell nuclei and truncated cell nuclei in a tissue section, said method comprising:

a) measuring by said image analysis apparatus the DNA content, profile area, and profile perimeter of each of said plurality of cell nuclei and truncated cell nuclei, and (b) using said profile perimeter to calculate an eccentricity index for each one of said plurality of cell nuclei and truncated cell nuclei, and (c) applying a ploidy method for analyzing quantitative nuclear DNA content in a tissue section wherein said ploidy method utilizes said eccentricity indicies, whereby the discrimination of subpopulations of different ploidy among the whole nuclei corresponding to said plurality of cell nuclei and truncated cell nuclei is improved, and the accuracy of the determination of the true DNA content of said whole nuclei is improved.

2. The eccentricity index of claim 1 wherein said eccentricity index is calculated as the ratio, raised to a power, of said profile perimeter to the perimeter of a circle, the area of said circle equaling said profile area.

3. The ploidy method of claim 1 wherein said ploidy method incorporates the reference curve method.

4. The ploidy method of claim 1 wherein said ploidy method incorporates the method of McCready and Papadimitriou.

5. The ploidy method of claim 1 wherein said ploidy method incorporates the method of Haroske and colleagues.

6. The ploidy method of claim 1 wherein said ploidy method incorporates the method of Bins and Takens.

7. The ploidy method of claim 1 wherein said ploidy method includes creation of a plurality of mutually exclusive shape classes according to said eccentricity indicies, and each of said shape classes is displayed using a different color.

8. The ploidy method of claim 1 wherein said ploidy method is applied selectively to a chosen one of said shape classes only, while ignoring the existence of all other ones of said shape classes.

9. The chosen one of said shape classes of claim 8 comprising the one of highest said eccentricity indicies.

10. The chosen one of said shape classes of claim 8 comprising the one of lowest said eccentricity indicies.

11. The chosen one of said shape classes of claim 8 comprising the one of average said eccentricity indicies.

12. The ploidy method of claim 1 wherein said ploidy method includes determination of the mean, median, or central value of the set of said eccentricity indicies, and said profile area and said DNA content are multiplied by a factor raised to a power, said factor reflecting the difference between said eccentricity index and said mean, said median, or said central value.

13. The ploidy method of claim 1 wherein said ploidy method includes multiplying or dividing said profile area and said DNA content, of each of said plurality of cell nuclei and truncated cell nuclei or else of each member of said chosen one of said shape classes, by a factor or divisor raised to a power, said factor or divisor reflecting the difference between said eccentricity index and unity.

14. The ploidy method of claim 3 wherein each data point is displaced perpendicular to the reference line, said displacement being proportional to the value of said eccentricity index.

* * * * *